United States Patent
Choo et al.

(10) Patent No.: US 7,005,791 B2
(45) Date of Patent: Feb. 28, 2006

(54) FLAT PANEL FOR CATHODE-RAY TUBE

(75) Inventors: Kyoung Mun Choo, Kyungki-do (KR); Eon Jin Jeong, Kyungki-do (KR); Seong Cheol Kim, Kyungki-do (KR)

(73) Assignees: Samsung Corning Co., Ltd., Kyungki-do (KR); Samsung SDI Co., Ltd., Kyungki-do (KR)

( * ) Notice: Subject to any disclaimer, the term of this patent is extended or adjusted under 35 U.S.C. 154(b) by 206 days.

(21) Appl. No.: 10/481,414

(22) PCT Filed: Jul. 2, 2002

(86) PCT No.: PCT/KR02/01250

§ 371 (c)(1),
(2), (4) Date: Dec. 30, 2003

(87) PCT Pub. No.: WO03/005402

PCT Pub. Date: Jan. 16, 2003

(65) Prior Publication Data

US 2004/0169454 A1    Sep. 2, 2004

(30) Foreign Application Priority Data

Jun. 30, 2001    (KR) ............................... 2001-38926

(51) Int. Cl.
 *H01J 29/70*    (2006.01)
 *H01J 31/00*    (2006.01)
(52) U.S. Cl. ............................... 313/477 R; 220/2.1 A; 220/2.3 A; 348/836; 348/826
(58) Field of Classification Search ............ 313/477 R, 313/461, 364, 478, 479; 220/2.1 A, 2.3 A, 220/2.1 R; 430/26, 27; 445/24; 348/825–827, 348/836, 818
See application file for complete search history.

(56) References Cited

U.S. PATENT DOCUMENTS

| 5,293,096 | A * | 3/1994 | Nakamura ............... 313/477 R |
| 6,283,814 | B1 | 9/2001 | Lee |
| 6,388,373 | B1 | 5/2002 | Nah |
| 6,566,802 | B1 | 5/2003 | Jeong |
| 2005/0184637 | A1 * | 8/2005 | Sugawara et al. ...... 313/477 R |

FOREIGN PATENT DOCUMENTS

| JP | 2000-113841 A | 4/2000 |
| KR | 2000-0073436 | 5/2000 |

* cited by examiner

*Primary Examiner*—Edward J. Glick
*Assistant Examiner*—Elizabeth Keaney
(74) *Attorney, Agent, or Firm*—Bacon & Thomas, PLLC

(57) ABSTRACT

The present invention is related to a flat panel for cathode-ray tube capable of securing a large viewing area in the flat panel which is fitted into a window of a cabinet. In accordance with the panel of the present invention, stepped portions are formed along an edge of a face to fit the panel into the window of the cabinet. A depth from a surface of the face to a surface of the stepped portion is set to satisfy a condition of $2 \geq Tf/Tc \geq 0.7$ where $Tf$ is a vertical distance from a starting point of the stepped portion to an inner surface of the panel and $Tc$ is a thickness of the center of the face. The panel in accordance with the present invention can provide perceptual flatness to a viewer; improved implosion-proof characteristics; and a structure capable of enduring an external mechanical impact. Further, the panel having a precise structure can be manufactured by a press-molding process.

5 Claims, 2 Drawing Sheets

FLAT PANEL FOR CATHODE-RAY TUBE

TECHNICAL FIELD

The present invention relates to a flat type cathode-ray tube panel; and, more particularly, to a flat panel for a cathode-ray tube capable of being manufactured in a structure having improved implosion-proof characteristics while securing a large viewing area in the flat panel which is fitted into a window of a cabinet.

BACKGROUND ART

Basically, a glass bulb for a cathode-ray tube used in manufacturing a color television set, a computer monitor or the like includes three components, i.e., a panel on which an image is projected, a conic funnel engaged to a rear surface of the panel, and a tube-shape neck adhered to an apex of the funnel. The panel, the funnel and the neck are all made of glass. Especially, the panel and the funnel are manufactured by press-molding a molten glass lump called a gob into a desired size and shape.

Further, the panel has a face and a skirt. Fluorescent materials for forming an image are coated on an inner surface of the face and a shadow mask having a plurality of holes is supported with pins on the skirt. Furthermore, an electron gun and a deflection yoke are installed at an inner and an outer side of the neck, respectively, wherein the electron gun forms an image by firing an electron beam toward the fluorescent materials through the holes of the shadow mask.

Such a cathode-ray tube is installed in a cabinet included as an external portion of the color television set or the computer monitor. However, since the face of the panel is positioned inside the cabinet and is seen through the window of the cabinet, an edge portion of the face of the panel may not be seen due to a width of the window frame of the cabinet depending on the position of a viewer, thereby reducing viewing area.

In Korean Patent Laid-Open Publication No. 2000-73436, there is disclosed an art capable of preventing the reduction of the viewing area by forming a recessed fitting portion along the edge of the face of the panel within a width range as to not interfere with the useful screen area and arranging the fitting portion of the panel flat on the window of the cabinet.

Since, however, the aforementioned prior art merely proposes that the fitting portion be formed at the face of the panel, without due regard to be paid to characteristics of a cathode-ray tube, there can occur various technical problems in practically applying the prior art to the manufacture of the panel. That is, in manufacturing the panel for the cathode-ray tube, implosion-proof characteristics of UL (underwriters' laboratories) standards should be satisfied, for example. Especially, in case that inside of the glass bulb becomes vacuum by evacuating the air therefrom, due to an atmospheric pressure difference between the inside and the outside of the glass bulb, a compressive stress will be generated on an inner surface of the glass bulb and a tensile stress on an outer surface of the glass bulb. In this case, a blend round portion connecting the face of the panel to the skirt thereof is subject to a maximum vacuum tensile stress due to the aforementioned atmospheric pressure difference, and therefore it is structurally very weak against a breakage or an implosion. Accordingly, the distribution of the vacuum tensile stress and the mechanical strength should be properly taken into account in designing and manufacturing the recessed fitting portion in the face of the panel.

DISCLOSURE OF INVENTION

It is, therefore, an object of the present invention to provide a flat panel for a cathode-ray tube, having improved implosion-proof characteristics and enduring an external mechanical impact while securing a large viewing area by arranging the face of the panel flat against a window of a cabinet and rendering the feeling of watching a display on a flatter screen to a viewer.

It is another object of the present invention to provide a flat panel for a cathode-ray tube capable of being manufactured in a precise structure by performing a press-molding process.

In accordance with the present invention, there is provided a flat panel for a cathode-ray tube having a stepped portion along an edge of a face to be duly fitted into a window of a cabinet, wherein a depth Td from a surface of the face to the stepped portion satisfies a condition of $2 \geq Tf/Tc \geq 0.7$ where Tf is a thickness of the panel at a starting point of the stepped portion and Tc is a thickness of the center of the face.

BRIEF DESCRIPTION OF DRAWINGS

The above and other objects and features of the present invention will become apparent from the following description given in conjunction with the accompanying drawings, in which.

BEST MODE FOR CARRYING OUT THE INVENTION

A preferred embodiment of a flat panel for a cathode-ray tube in accordance with the present invention will now be described with reference to the accompanying drawings.

Figure 1:
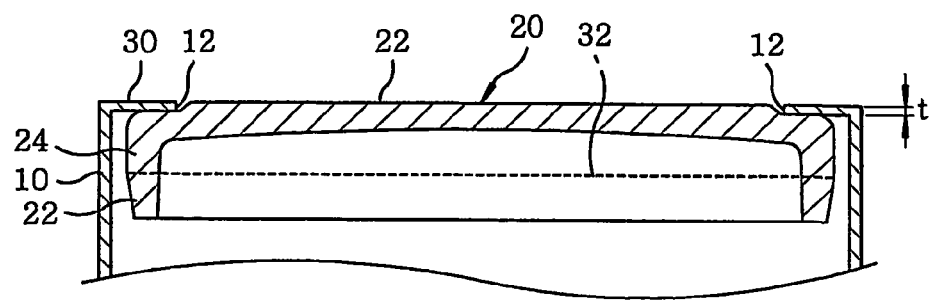
FIG. 1 illustrates a cross sectional view of a flat panel for a cathode-ray tube of the present invention installed in a cabinet.
Figure 3:
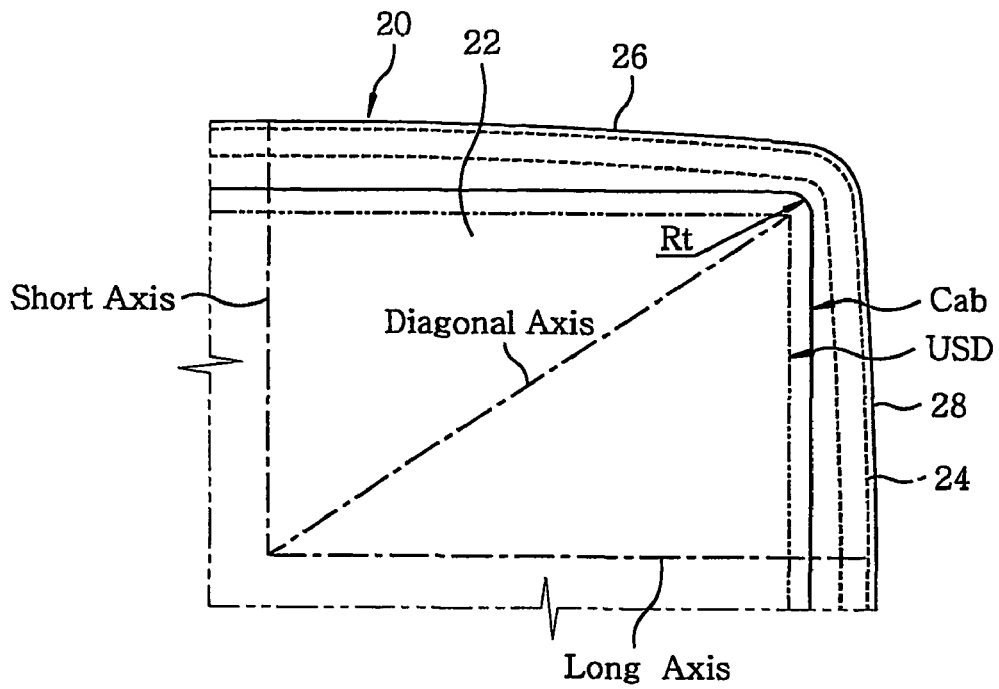
FIG. 3 presents a partial front view of the flat panel for the cathode-ray tube in accordance with the present invention.

First, referring to FIG. 1, a window 12 of a rectangular shape is formed in a cabinet 10 or a case which constitutes an external portion of a color television set or a computer monitor. A flat panel 20 of the cathode-ray tube in accordance with the present invention includes a face 22 displaying a picture and a skirt 24 extending backwards from an edge of the face 22. Further, as shown in FIG. 3, the panel 20 is formed in a rectangular shape having two longer sides 26 and two shorter sides 28, and the center of the face 22 is an intersection where the face 22 meets a tube axis line connecting a center of diagonal lines formed by four corners of the face 22 to a center of a neck.

Figure 2:
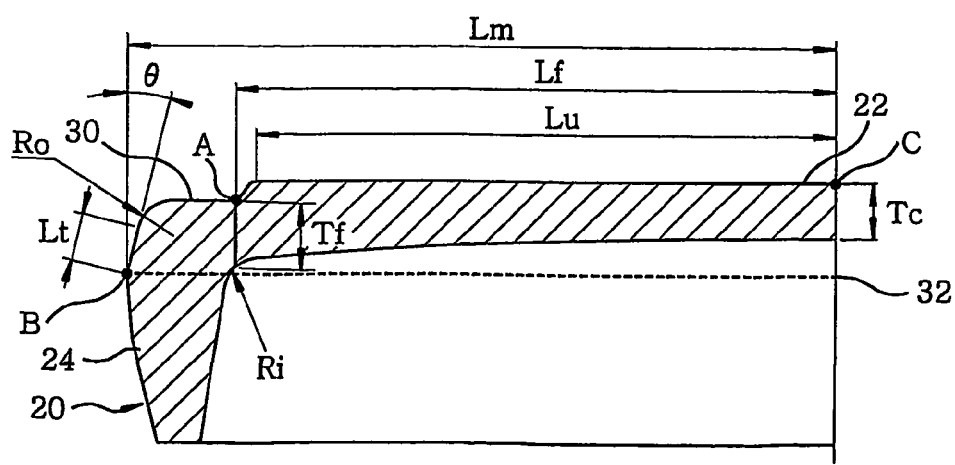
FIG. 2 depicts a partial cross sectional view of the flat panel for the cathode-ray tube of the present invention along a diagonal direction thereof.
Figure 4:
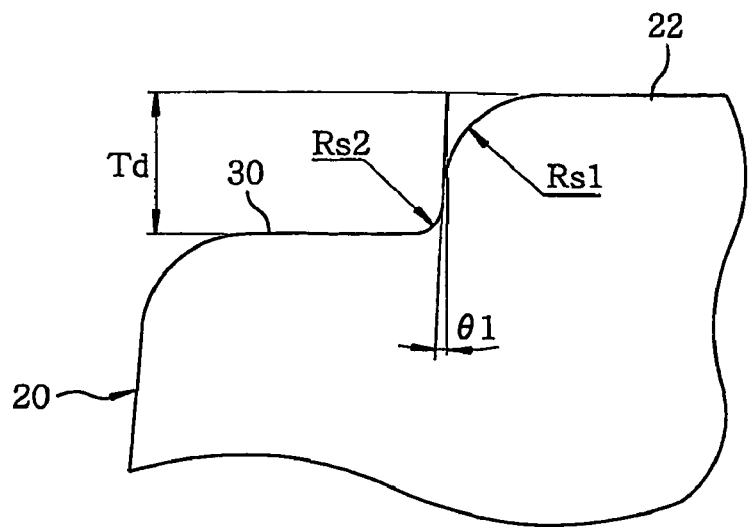
FIG. 4 represents a partially enlarged view of a stepped portion of the flat panel for the cathode-ray tube in accordance with the present invention.

As shown in FIGS. 1, 2 and 4, formed along the edge of the face 22 of the panel 20 in accordance with the preferred embodiment is a stepped portion 30, which is placed on window 12 of the cabinet 10 by fitting the face 22 thereinto. Herein, the stepped portion 30 represents a straight portion from an end portion of an outside blend round portion having a radius Ro to a starting point of a rounded portion having a radius Rs2 where the stepped portion starts. By fixedly fitting the face 22 of the panel 20 into the window 12 of the cabinet 10 and making the stepped portion 30 of the panel 20 be supported by an inner surface of the cabinet 10 adjoined to the window 12, the face 22 of the panel 20 is arranged in an identical plane with the window 12 of the cabinet 10, thereby ensuring a large visible screen area and providing the viewer the feeling of watching a flatter display screen.

In FIG. 2, A is a point where the stepped portion 30 of the panel 20 starts, B is a point where the outside of the panel 20 meets a mold match line 32, C is the center of the face 22, Ro is an outside blend radius, Ri is an inside blend radius, Tc is a thickness (mm) of the panel at C, Tf is a vertical distance (mm) from A to an inner surface of the panel 20, Lf is a distance (mm) from C to A along a diagonal direction of the panel 20, Lm is a distance (mm) from C to B along the diagonal direction of the panel 20, Lt is a distance (mm) from B to a starting point of the outside blend round portion having the radius Ro, and Lu is a distance (mm) from C to an end portion of a useful screen along the diagonal direction, wherein the useful screen, as is well known, is a portion of the screen where an actual viewing area of the screen is formed by coating a fluorescent layer in the CRT, and the end portion thereof is disposed around the inside blend round portion. And, θ represents a mold in angle in degrees, i.e., an angle between a vertical line to the mold match line 32 and a straight line formed from a starting point of the mold match line 32 to the outside blend round portion having the radius Ro. The mold match line 32 described in FIGS. 1 and 2 is a line formed on the outer surface of the panel 20 by an interface of a middle mold and a bottom mold when press-molding the panel 20 by the molds. Also, in FIG. 4, Td is a depth from the outer surface of the face 22 to a surface of the stepped portion 30, Rs1 is a radius of a round portion of the edge of the face where the stepped portion 30 is formed, and Rs2 is a radius of a round portion where the stepped portion is started.

And, when the stepped portion 30 is formed on the face 22 of the panel 20, it is preferable that various factors such as the thickness of the stepped portion 30 and the starting point thereof should be taken into account to satisfy implosion-proof characteristics of UL standards to ensure reliability.

In forming the stepped portion 30 of the panel 20, the smaller the depth (Td) value from the surface of the face 22 to the surface of the stepped portion 30 is, the better the mechanical strength becomes. However, it is preferable that a thickness (t) of the cabinet 10, the width of the window frame 12 and the press-molding process are taken into account in selecting the suitable depth (Td) value.

In the panel 20 of the present invention, the depth (Td) from the surface of the face 22 to the surface of the stepped portion 30 is designed to satisfy Equation 1 below.

$$2 \geq Tf/Tc \geq 0.7 \qquad \text{Equation 1}$$

By setting the depth (Td) so as to satisfy Equation 1, the reliability in the implosion-proof tests and the life of the panel can be ensured.

In FIG. 3, the USD (useful screen diameter) represents a useful screen of the panel; a Cab, a starting point of the stepped portion contacting the cabinet; and Rt, a radius of a round portion located at the corner region of the stepped portion in contact with the cabinet. Referring to FIG. 3, in the face 22 of the panel 20, in general, the vacuum stress is concentrated on the end portions of the useful screen along the direction of the shorter axis, which are formed thinner than the other end portions along the directions of the other axes. Accordingly, when forming the stepped portion 30 in the face 22 of the panel 20, it is advantageous to move the starting point of the stepped portion 30 toward outside of the useful screen for maintaining the mechanical strength. To maintain the mechanical strength of the panel 20, the length of the stepped portion 30 along the direction of the shorter axis of the face 22 should be configured to be as short as possible. And, the length of the stepped portion 30 along the direction of the shorter axis is determined by a length of the stepped portion 30 along the direction of the diagonal axis. Therefore, it is preferable that the distance (Lf) from the center of the face 22 to the starting point of the stepped portion 30 along the diagonal direction is set longer than that of the useful screen along the diagonal line, while the length of the stepped portion 30 along the diagonal axis is set to be greater than or equal to 3 mm, which is a minimum length needed for installing the cabinet 10 on the panel 20.

To be more specific, to avoid the reduction of the viewing area due to the window 12 of the cabinet 10, the distance (Lf) from the center of the face 22 to the starting point of the stepped portion 30 along the diagonal line of the panel 20 should satisfy Equation 2 below.

$$Lm - Lt \times \sin\theta - Ro - 3 \geq Lf \geq Lu \text{ (mm)} \qquad \text{Equation 2}$$

In Equation 2, Ro is the outside blend radius.

Further, the closer a value of Lf to $Lm-Lt \times \sin\theta - Ro - 3$ (mm), the better the mechanical strength. In case the value of Lf doesn't satisfy Equation 2, it is difficult to mount the face 22 of the panel 20 to the window 12 of the cabinet 10 along the stepped portion 30.

In addition, a value of the outside blend radius (Ro) in Equation 2 is chosen to satisfy Equation 3 in order to provide an adequate mechanical strength and a favorable press-molding process.

$$10 \text{ mm} \geq Ro \geq 3 \text{ mm} \qquad \text{Equation 3}$$

A defect on the glass surface can cause a breakage of the surface when external mechanical impacts are applied. When the stepped portion 30 is formed in the face 22 of the panel 20, it is highly probable that a surface defect in the panel 20 is incurred, and the panel 20 having the surface defect can be easily broken while performing the press-molding process or a thermal treatment for assembling the cathode-ray tube, and therefore, such should be taken into account when forming the stepped portion 30.

Further, in case that the stepped portion 30 is formed in a rectangular shape along the edge portion of the face 22 of the panel 20, the corner portions of the face can be easily broken and a thermal stress is concentrated thereat during thermal treatment, thereby resulting in the breakage of the panel 20. These problems can be solved by rounding the diagonal portions of the panel 20 to have a radius greater than or equal to 1 mm. The larger radius of the diagonal portions is advantageous for the press-molding process and the thermal treatment of the panel 20. Since, however, the corner portions of the window 12 of the cabinet 10 should also be rounded to match the panel 20, the perceptual flatness of the panel 20 having a larger radius at the diagonal portions can be reduced.

Accordingly, the radius (Rt) of the diagonal portions of the stepped portion 30 contacting the cabinet 10 is formed to satisfy. Equation 4 described below, thereby minimizing the loss of perceptual flatness of the panel 20.

$$10 \text{ mm} \geq Rt \geq 1 \text{ mm} \qquad \text{Equation 4}$$

Referring back to FIG. 4, for the same reasons described above, the rounding treatments are performed on the edge portion of the face 22 and the starting point of the stepped portion 30, respectively. The Radius (Rs1) of the round portion of the edge of the face 22 and the Radius (Rs2) of the round portion of the starting point of the stepped portion 30 are related to the depth (Td) in such a way that they are determined by a value of the depth (Td).

Accordingly, the Radius (Rs1) of the round portion of the edge of the face 22 and the Radius (Rs2) of the round portion of the starting point of the stepped portion 30 are formed to satisfy Equation 5 described below, thereby preventing the breakage of the edge portions of the panel 20 and minimizing the loss of perceptual flatness of the panel 20.

$$Rs1(=Rs2) \geq 1 \text{ mm} \qquad \text{Equation 5}$$

In case that a vertical plane is present at the starting point of the stepped portion 30, it is difficult to unload the panel 20 from the bottom mold when press-molding the panel 20, and further, while unloading the panel 20 from the bottom mold, the surface of the panel 20 can be easily scratched by the bottom mold, thereby resulting in the breakage of the panel 20.

Accordingly, it is preferable that the face 22 and the stepped portion 30 are directly connected through the respective round portions having the radii Rs1 and Rs2 or in case that they are not directly connected with each other, it is preferable that the surface between the respective round portions is tapered to prevent stiff thermal stress from being rapidly concentrated on the stepped portion 30. However, in case that the surface is tapered greater than or equal to 45°, the starting point of the stepped portion 30 should be moved toward the center portion of the face 22 to secure the minimum diagonal length of the stepped portion 30, i.e., 3 mm, that is needed to fit the face 22 into the window 12 of the cabinet 10. This, however, makes the edge portions along the direction of the shorter axis where the maximum stress is applied be moved toward the inner portion of the panel 20, thereby resulting in weakening of the mechanical strength of the panel 20.

Accordingly, a taper ($\theta1$) value of the surface which connects the face 22 to the stepped portion 30 is required to be formed to satisfy Equation 6 described below.

$$45° \geq \theta1 \geq 0° \qquad \text{Equation 6}$$

In this way, the mechanical strength of the panel 20 can be increased and a stiff thermal stress can be prevented from being concentrated on the stepped portion 30, which in turn can effectively prevent the breakage of the edge portion of the panel 20. Further, when performing the press-molding process, the panel 20 can be easily taken out from the molds without incurring any damage thereto.

As described above, in the flat panel for the cathode-ray tube in accordance with the present invention, the surface of the cabinet and the surface of the face are arranged in a flat plane by fitting the face of the panel into the window of the cabinet, so that the panel can be manufactured in such a way that it is capable of ensuring a large viewing area, rendering improved perceptual flatness to the viewer, having improved implosion-proof characteristics and enduring the external mechanical impacts. Further, the panel having the precise structure can be manufactured by employing the press-molding process.

While the present invention has been described with respect to certain preferred embodiments only, other modifications and variations may be made without departing from the sprit and scope of the present invention as set forth in the following claims.

What is claimed is:

1. A flat panel for a cathode-ray tube having a stepped portion to be fitted into a window of a cabinet along an edge of a face,
wherein a depth from a surface of the face to a surface of the stepped portion is set to satisfy a relation of $2 \geq Tf/Tc \geq 0.7$ where Tf is a vertical distance from a starting point of the stepped portion to an inner surface of the panel and Tc is a thickness of the center of the face.

2. The flat panel for the cathode-ray tube of claim 1, wherein a distance (Lf) from the center of the face to a starting point of the stepped portion along a diagonal line of the panel satisfies $Lm - Lt \times \sin \theta - Ro - 3 \geq Lf \geq Lu$ and an outside blend radius (Ro) satisfies $10 \text{ mm} \geq Ro \geq 3 \text{ mm}$,
where Lm is a distance from the center of the face to a mold match line along a diagonal direction of the panel, Lt is a distance from the mold match line to a starting point of an outside blend round portion having the outside blend radius Ro, $\theta$ is a mold in angle, Lf is a distance from the center of the face to the starting point of the stepped portion along the diagonal direction and Lu is a distance from the center of the face to an end portion of a useful screen along the diagonal direction.

3. The flat panel for the cathode-ray tube of claim 1 or 2, wherein a radius Rt of a diagonal portion of the stepped portion contacting the cabinet satisfies $10 \text{ mm} \geq Rt \geq 1 \text{ mm}$.

4. The flat panel for the cathode-ray tube of claim 3, wherein a radius Rs1 of a round portion of an edge of the face and a radius Rs2 of a round portion of the starting portion of the stepped portion satisfy Rs1 (=Rs2)$\geq 1$ mm, respectively.

5. The flat panel for the cathode-ray tube of claim 4, wherein a taper ($\theta1$) of a surface which connects the face to the stepped portion satisfies $45° \geq \theta1 \geq 0°$.

* * * * *